B. F. BROWN.
Horse Hay Fork.
No. 112,777.
Patented Mar. 21, 1871.
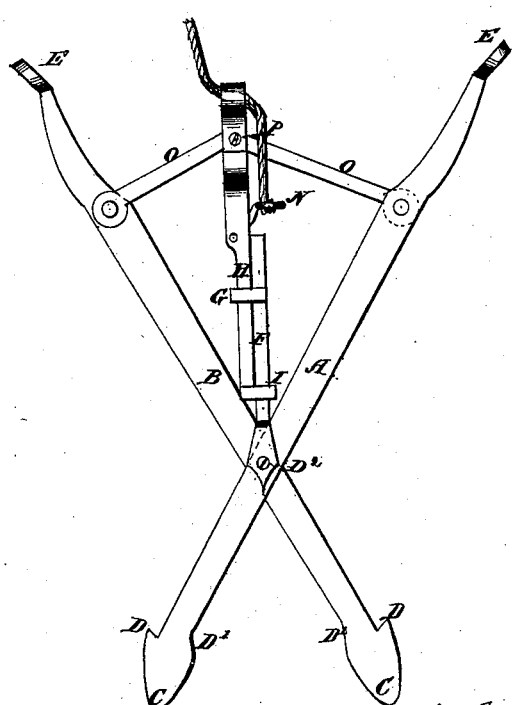
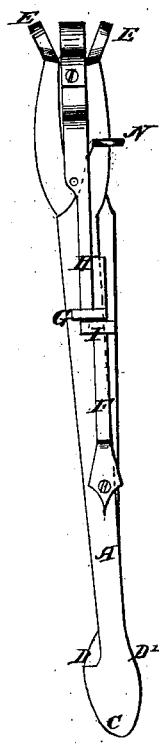
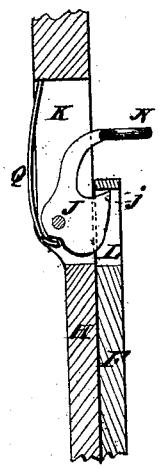
Witnesses:
P. C. Dieterich
Wm. H. C. Smith
Inventor:
B. F. Brown
per
Attorneys.

United States Patent Office.

BENJAMIN F. BROWN, OF CATLIN, INDIANA.

Letters Patent No. 112,777, dated March 21, 1871.

IMPROVEMENT IN HORSE HAY-FORKS.

The Schedule referred to in these Letters Patent and making part of the same.

*To all whom it may concern:*

Be it known that I, BENJAMIN F. BROWN, of Catlin, in the county of Parke and State of Indiana, have invented a new and improved Hay-Fork; and I do hereby declare that the following is a full, clear, and exact description thereof, which will enable others skilled in the art to make and use the same, reference being had to the accompanying drawing forming part of this specification.

This invention relates to improvements in hay-forks, and consists in a pair of bars, barbed at one end and pivoted together, so that, the bars being closed against each other, the said barbed ends constitute one point, which may by readily forced into the hay, after which they may be separated, to hold it for elevating, in which position they are held by a pair of bars and a trip-catch, one of which bars is connected to the lifting-bars where they are pivoted, and the other to a pair of toggle-jointed bars pivoted to the said lifting-bars, and this latter slides on the other as the lifting-bars open and close, and is held in one position to keep them open by the trip-catch, all as hereinafter described.

Figure 1 is a side elevation of my improved fork when in the position for driving into the hay.

Figure 2 is a side elevation of the same when extended after driving in to lift the hay; and Figure 3 is a section of the tripping apparatus.

Similar letters of reference indicate corresponding parts.

A and B represent a pair of flat metal bars, terminating at one end in a point, C, having a barb, D, at one edge. They are pivoted together at $D^2$, and the upper ends have eyes, E, for the attachment of the lifting-ropes.

F is a bar, connected at one end to the pivot-joint D, while the other extends upward about half as far as the upper ends of A and B; and it has a yoke, G, which confines another bar, H, against one side while sliding back and forth on it.

This bar H has a similar yoke, I, which works on bar F, which passes through it.

This bar H carries a trip-catch, J, pivoted in a slot, K, which is about as high as the top of F when bar H is in its lowest position, at which time the point $j$ of the trip-catch will engage in a mortise or notch, L, in the upper end of F.

The said trip-catch has an eye, N, in the end which is on the side of the pivot opposite to the one where the catch $j$ is, for the attachment of the trip-yoke, for tripping, by pulling eye N upward, which forces point $j$ inward beyond the wall of mortise L. The trip-catch rests on the bottom of mortise K when holding bar H down.

The bars A B are connected near the upper ends by the toggle-jointed bars O, and the bar H is connected to them, when they are jointed, by the pivot P.

When the fork has been thrust into the hay and extended, as shown in fig. 2, the trip-catch being forced down below the top of bar F, the joint $j$ will be forced into the notch by the spring Q, and it will hold the bars A B in the extended position until the trip-rope is pulled and the catch disconnected from bar F; then the gravity of the load and the fork will cause the bars A B to come together, and the load will fall off.

The curved shoulders D' of each point C cause the hay to slide over the barb D of the other point freely when the discharging takes place.

Having thus described my invention,

I claim as new and desire to secure by Letters Patent—

The combination, with the barbed bars A B, pivoted together, and having the eyes E for the attachment of the hoisting-rope, of the bars F H, the toggle-jointed bars O, and the trip-catch, all arranged substantially as specified.

BENJAMIN F. BROWN.

Witnesses:
CHARLES ELSON,
WILL. H. ELSON.